(12) United States Patent
Bacon

(10) Patent No.: US 6,879,991 B2
(45) Date of Patent: Apr. 12, 2005

(54) SYNCHRONOUS COLLECTION OF CYCLIC GARBAGE IN REFERENCE COUNTING SYSTEMS

(75) Inventor: David Francis Bacon, New York, NY (US)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 10/011,051

(22) Filed: Dec. 7, 2001

(65) Prior Publication Data

US 2002/0107880 A1 Aug. 8, 2002

Related U.S. Application Data

(60) Provisional application No. 60/254,615, filed on Dec. 11, 2000, and provisional application No. 60/254,691, filed on Dec. 11, 2000.

(51) Int. Cl.[7] .............................................. G06F 17/30
(52) U.S. Cl. ..................................................... 707/206
(58) Field of Search ........................ 707/206; 711/100

(56) References Cited

U.S. PATENT DOCUMENTS

| | | | | |
|---|---|---|---|---|
| 5,900,001 A | * | 5/1999 | Wolczko et al. ............ | 707/206 |
| 5,920,876 A | * | 7/1999 | Ungar et al. ................ | 707/206 |
| 6,115,782 A | * | 9/2000 | Wolczko et al. ............ | 711/100 |
| 6,314,436 B1 | * | 11/2001 | Houldsworth ............... | 707/206 |
| 6,594,678 B1 | * | 7/2003 | Stoutamire et al. ......... | 707/206 |

OTHER PUBLICATIONS

Jones et al., "Garbage Collection," John Wiley and Sons, ch. 3 (1996).

* cited by examiner

Primary Examiner—Diane D. Mizrahi
(74) Attorney, Agent, or Firm—Ryan, Mason & Lewis, LLP; Casey P. August, Esq.

(57) ABSTRACT

Techniques are provided that speed synchronous garbage collection in systems that use reference counting. The present invention performs each of the steps of marking, scanning, and collecting on all nodes that are possibly nodes in a cycle of garbage. These nodes are referred to as "root" nodes herein. In other words, an aspect of the present invention performs the step of marking on each root node, the step of scanning on each root node, and the step of collecting on each root node. Performing one or more of these steps on all of the root nodes results in a lower number of operations than selecting single root nodes, performing these steps on each root node, and iterating until all root nodes are selected. Additionally, before root nodes are added to a buffer, they are examined to determine if they are already in the buffer. If they are, they are not added to the buffer. This prevents the same root node from being examined multiple times. Finally, nodes are examined to determine whether they are acyclic. Acyclic nodes are ignored when finding cyclic garbage.

19 Claims, 13 Drawing Sheets

```
Increment(S)
    RC(S) = RC(S) + 1
    color(S) = black

Decrement(S)
    RC(S) = RC(S) - 1
    if (RC(S) == 0)
        Release(S)
    else
        PossibleRoot(S)

Release(S)
    for T in children(S)
        Decrement(T)
    color(S) = black
    if (! buffered(S))
        SystemFree(S)

PossibleRoot(S)
    if (color(S) != purple)
        color(S) = purple
        if (! buffered(S))
            buffered(S) = true
            append S to Roots CollectCycles()
    MarkRoots()
    ScanRoots()
    CollectRoots()

MarkRoots()
    for S in Roots
        if (color(S) == purple
                and RC(S) > 0)
            MarkGray(S)
        else
            buffered(S) = false
            remove S from Roots
            if (color(S) == black and
                    RC(S) == 0)
                SystemFree(S)

ScanRoots()
    for S in Roots
        Scan(S)

CollectRoots()
    for S in Roots
        remove S from Roots
        buffered(S) = false
        CollectWhite(S)

MarkGray(S)
    if (color(S) != gray)
        color(S) = gray
        for T in children(S)
            RC(T) = RC(T) - 1
            MarkGray(T)

Scan(S)
    if (color(S) == gray)
        if (RC(S) > 0)
            ScanBlack(S)
        else
            color(S) = white
            for T in children(S)
                Scan(T)

ScanBlack(S)
    color(S) = black
    for T in children(S)
        RC(T) = RC(T) + 1
        if (color(T) != black)
            ScanBlack(T)

CollectWhite(S)
    if (color(S) == white
            and ! buffered(S))
        color(S) = black
        for T in children(S)
            CollectWhite(T)
        SystemFree(S)
```

FIG. 11

SYNCHRONOUS COLLECTION OF CYCLIC GARBAGE IN REFERENCE COUNTING SYSTEMS

CROSS REFERENCE TO RELATED APPLICATIONS

This application claims the benefit of U.S. Provisional Application No. 60/254,615, filed Dec. 11, 2000, and U.S. Provisional Patent Application No. 60/254,691, filed Dec. 11, 2000.

FIELD OF THE INVENTION

The present invention relates to garbage collection in computer systems and, more particularly, relates to synchronous collection of cyclic garbage in reference counting systems.

BACKGROUND OF THE INVENTION

The term "garbage" is used to describe an object or data element that is no longer accessible by a computer program. Some operating systems are designed with no garbage detection and collection programs. In these systems, it is up to the programmer to remember to reclaim objects and data that is no longer accessible. Garbage occupies part of the memory of a computer system but serves no purpose. If a computer program does not run for very long or is infrequently run, garbage collection is not a problem because the computer system generally has plenty of memory. However, if the program creates garbage and is run for a long time or frequently, the extraneous garbage can grow to occupy all of the useful memory of the computer system. This will cause a system shutdown or other deleterious effects. Today, programs are designed to run continuously all day, every day. Business servers simply cannot experience unscheduled shutdowns.

The effect of garbage has been known from the beginning of the computer era. In fact, forty years ago, two methods of automatic garbage collection for computer systems were introduced: reference counting and tracing. Reference counting is described in Collins, "A Method for Overlapping and Erasure of Lists," Communications of the Ass'n for Computing Machinery (ACM) 3, 655–657 (1960), while tracing is described in McCarthy, "Recursive Functions of Symbolic Expressions and Their Computation by Machine," Communications of ACM 3, 184–195 (1960), the disclosures of which are incorporated herein by reference. Briefly, in reference counting, a reference count is used in an object to track how many other objects reference this object. Reference counts are incremented and decremented, and a reference count of zero indicates that the object is garbage because it is unreachable by any other object. In tracing, the entire object graph is traced. Since this early time, tracing collectors and their variants have been much more widely used due to perceived deficiencies in reference counting.

Changes in the relative costs of memory and processing power, and the widespread adoption of languages that employ garbage collection, have modified the landscape. As processor clock speeds increase while Random Access Memory (RAM) becomes plentiful but not significantly faster, certain properties of reference counting make it more appealing. Moreover, the purported extra processing power required is likely to be less relevant.

At the same time, the incorporation of garbage collection by the programming language Java has thrust the problem into the mainstream. Now, large, mission-critical systems are being built in Java. This stresses the flexibility and scalability of the underlying garbage collection implementations used in Java. As a result, the supposed advantages of tracing collectors, namely, simplicity and low overhead, are being eroded as they are being made ever more complex in an attempt to address the real-world requirements of large and varied programs.

Furthermore, the fundamental assumption behind tracing collectors, namely, that it is acceptable to periodically trace all of the live objects in the heap (an area of memory reserved for data that is created during runtime), will not necessarily scale to the very large main memories that are becoming increasingly common.

There are three primary problems with reference counting: (1) the storage overhead associated with keeping a count for each object; (2) the runtime overhead of incrementing and decrementing the reference count each time a pointer is copied; and (3) the inability to detect cyclic garbage and consequent necessity of including a second garbage collection technique to deal with cyclic garbage.

The inability to collect cyclic garbage (also called "cycles" herein) is generally considered to be the greatest weakness of reference counting collectors. It places the burden on the programmer to break cycles explicitly, requires special programming idioms, or requires a tracing collector to collect the cycles.

The problem of cycles in reference counting systems is illustrated in FIGS. 1 and 2. FIG. 1 shows a subgraph 100 containing a number of nodes 110, 125, 130, 135, 140, 145, 150, and 155 therein. When a computer program runs, it creates a number of objects or data structures or both. The interrelationship between the program, the objects, and the data structures is commonly called a graph. FIG. 1 shows a subset of a graph created by an executing program (the program is not shown). This subset is subgraph 100.

Subgraph 100, as discussed above, contains a number of nodes 110, 125, 130, 135, 140, 145, 150, and 155. Each node represents an object or part of a data structure. Between each node is one or more edges. For instance, between node 110 and node 125 is edge 115, and between node 110 and node 140 is edge 120. Additionally, node 110 is connected to the rest of the graph (not shown) through edge 105. Each edge represents a reference from one node to another node. In FIG. 1, node 110 is referencing node 125 through edge 115, and it is also referencing node 140 through edge 120.

In a reference counting system, the reference count for each node is tracked. For instance, node 125 has a Reference Count (RC) of two because nodes 110 and 135 reference node 125. In FIG. 1, subgraph 160 represents a cyclic structure, while subgraph 170 represents an acyclic structure. Subgraph 160 represents a cyclic structure because there is a series of edges that traverses nodes and that starts at node 125 and ends at 125. In other words, one can traverse this graph by starting at one node and ending at the same node. Thus, subgraph 160 is cyclic. In subgraph 170, conversely, there is no series of edges that traverses nodes and that starts at one node and ends at the same node. Thus, subgraph 170 is acyclic.

FIG. 2 shows a resultant subgraph 200 that occurs after the program removes the references from node 110 that created edges 115 and 120. Even though the program explicitly removes the references, a "mutator" actually performs the low level removal of references. The process undertaken by the mutator is generally hidden from a programmer. A garbage collector will easily recognize that subgraph 170 is garbage, because the reference count for node 140 is zero. A zero indicates that node 140 is no longer being referenced by the program, and, therefore, the node may be removed. Because node 140 can be removed, nodes 145, 150, and 155 can also be removed.

Subgraph 160 is more challenging for a garbage collector. There is no node that contains a reference count of zero. Even though this subgraph 160 cannot be accessed by the program, the reference counts are non-zero. A garbage collector in this instance will have to select a node and search through the entire subgraph to determine that no node in the subgraph is referenced by a node outside of the subgraph. It can then eliminate subgraph 160 as garbage.

There are synchronous techniques for collecting this type of cyclic garbage in reference counting computer systems. However, these techniques are extremely slow and are not efficient in other respects.

Thus, better and faster techniques are needed for synchronous collection of cyclic garbage in reference counting computer systems.

SUMMARY OF THE INVENTION

The present invention provides techniques that speed synchronous garbage collection in systems that use reference counting. Generally, an embodiment of the present invention performs each of the steps of marking, scanning, and collecting on all nodes that are possibly nodes in a cycle of garbage. These nodes are referred to as "root" nodes herein. In other words, an embodiment of the present invention performs the step of marking on all root nodes, the step of scanning on all root nodes, and the step of collecting on all root nodes. Performing one or more of these steps on all of the root nodes results in a lower number of operations than selecting single root nodes, performing these steps on each root node, and iterating until all root nodes are selected.

Additionally, before nodes are added to a buffer as possible roots of cyclic garbage, the nodes are examined to determine if they are already in the buffer. If they are, they are not added to the buffer. This prevents the same root node from being examined multiple times. Finally, nodes are examined to determine whether they are acyclic. Acyclic nodes are ignored when finding cyclic garbage.

A more complete understanding of the present invention, as well as further features and advantages of the present invention, will be obtained by reference to the following detailed description and drawings.

BRIEF DESCRIPTION OF THE DRAWINGS

FIG. 11 is an exemplary listing of pseudocode instructions used to implement garbage collection of cyclic data structures in a reference counting computer system, in accordance with one embodiment of the present invention.

DETAILED DESCRIPTION OF PREFERRED EMBODIMENTS

The present invention relates to garbage collection in computer systems using reference counting techniques. For those individuals who are not generally familiar with reference counting, the following section below presents many of the basic concepts and terminology that will help in understanding the invention. Importantly, this section also explains a significant weakness in current reference counting techniques.

Reference Counting Concepts and Terminology

Prior to discussing reference counting techniques, it is worthwhile to discuss some conventions used in this specification. The terms "node" and "object" are considered interchangeable, as are "edge" and "reference," and "graph" and "object diagram." An edge connects one node to itself or to another node in a graph, while a reference connects one object to itself or another object in an object diagram. Graph theorists tend to use the former terms, while software engineers tend to use the latter terms. Additionally, the term "cycle" will be used to indicate a series of nodes that are cyclic and garbage. Also, nodes or objects will generally be "marked" with a "color" in the upcoming discussion. The color analogy is widely used in literature that discusses garbage collection, so it will be retained here. The meanings of the colors used herein are as follows: black indicates that a node is "in use" or "free"; gray indicates that a node is a possible member of a cycle; white indicates that a node is a member of a cycle; purple indicates a possible root of a cycle; and green indicates that the node is acyclic.

Figure 1:
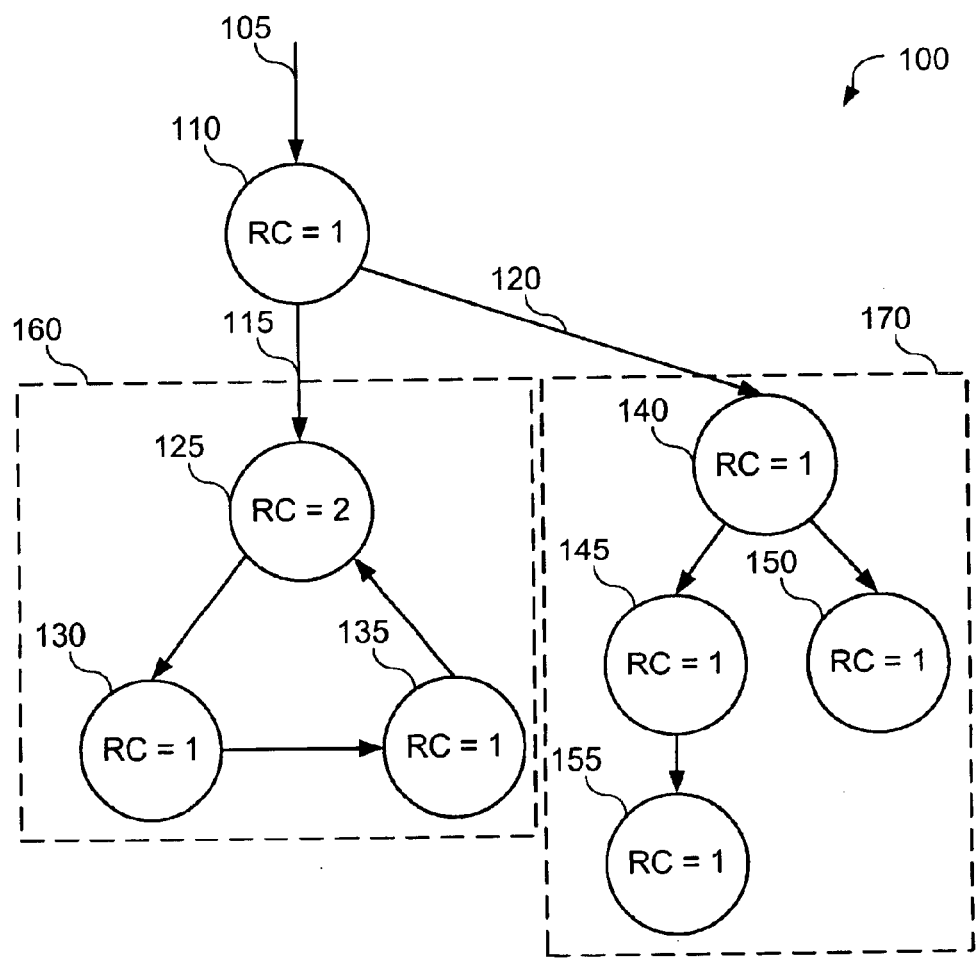
FIGS. 1 and 2 are exemplary diagrams of a subgraph and data structures therein.
Figure 2:
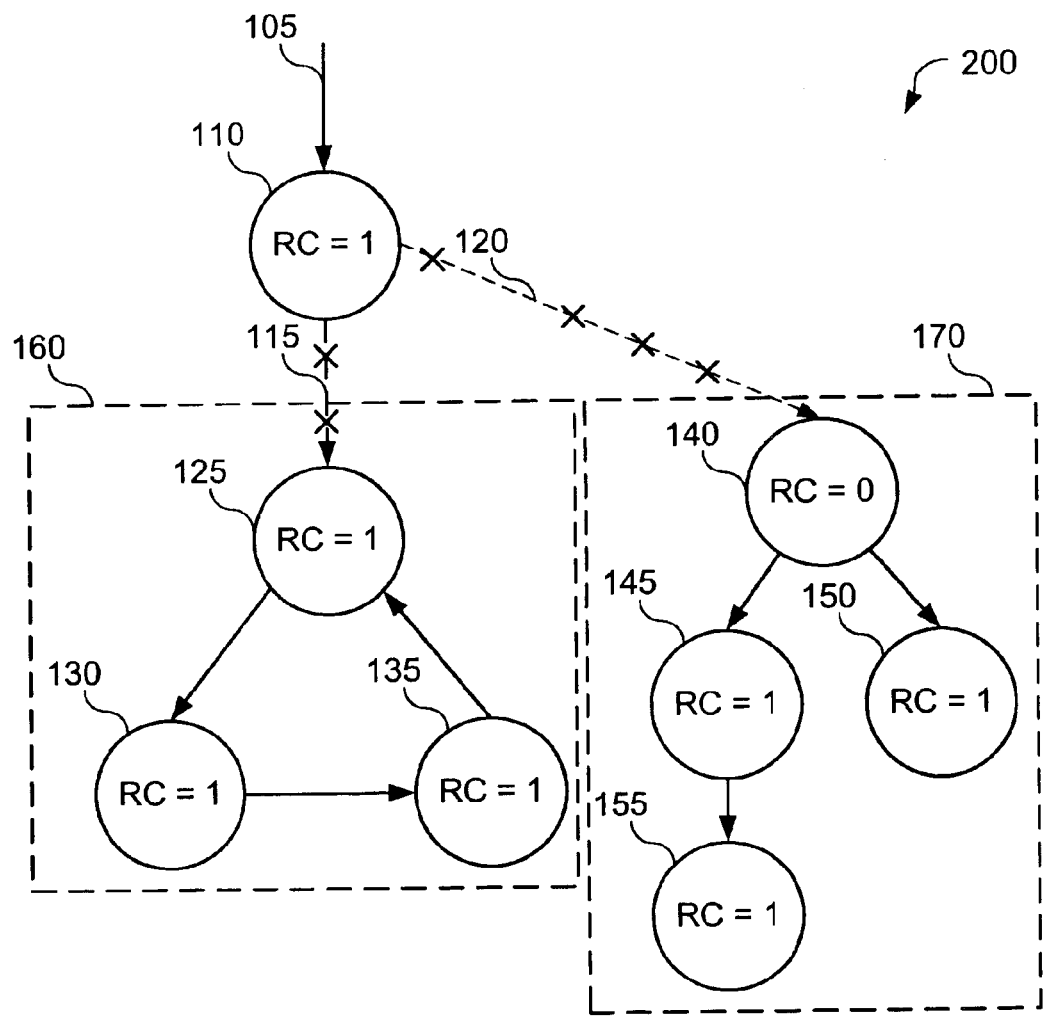
Figure 3:
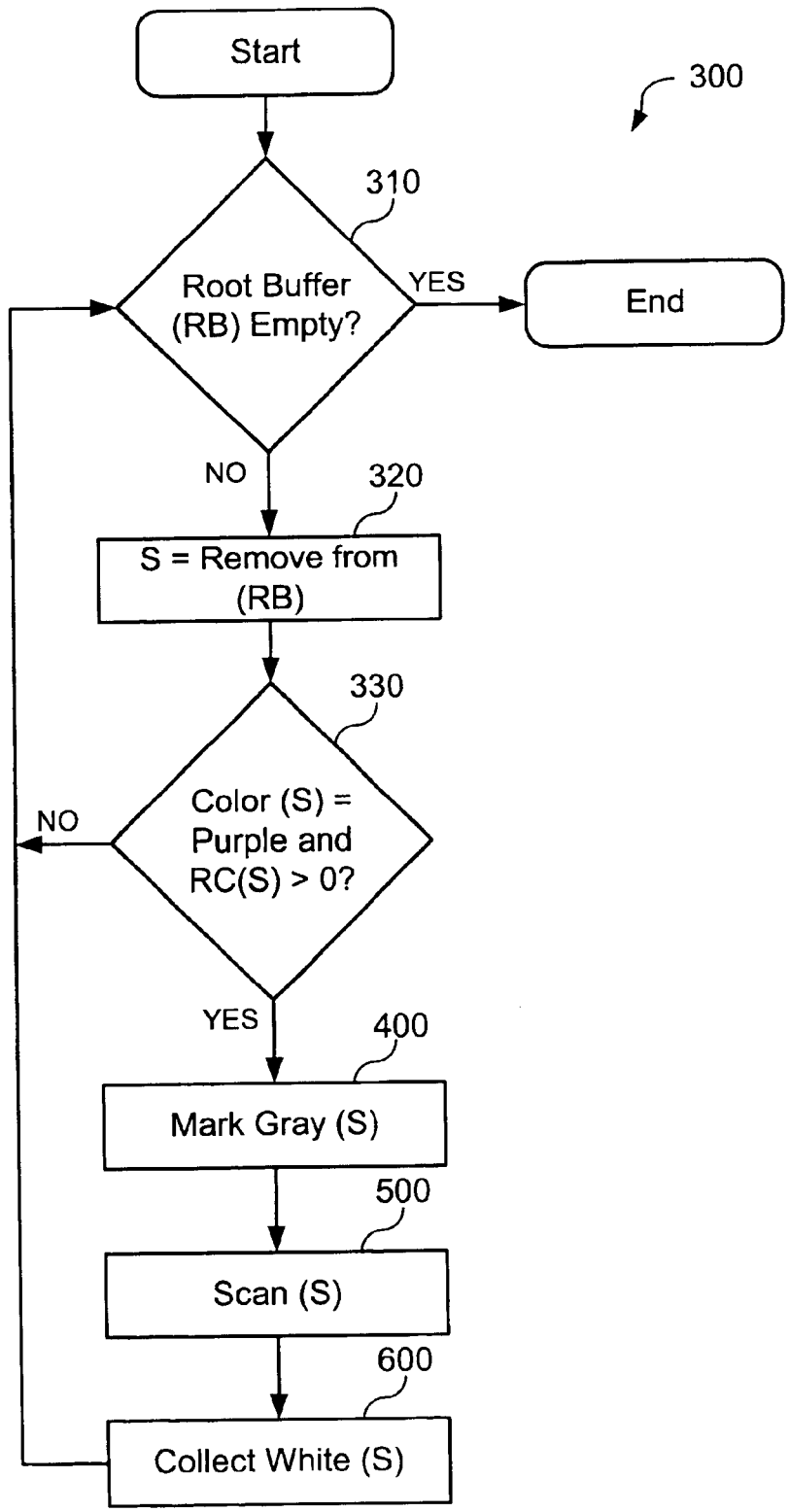
FIG. 3 is a flowchart of a prior art method of garbage collection for cyclic data structures in a reference counting computer system.

Referring now to FIG. 3, a flowchart of a prior art method 300 for collecting cyclic garbage is shown. Method 300 is performed by a garbage collector. Prior to performing method 300, a system will create a root buffer. The "root buffer" is a location used to store references to nodes. Each node referenced by an entry in the root buffer is potentially garbage and also potentially the "root" of a cycle of garbage. In general, a mutator, which makes changes to the graph of a program, will keep track of increments and decrements to reference counts. The mutator will communicate these changes to a garbage collector. The garbage collector tracks the changes by determining if a reference count for a node has been decremented but not to zero. For a garbage cycle to occur, the reference count of at least one node must be, at some time, more than one. If the reference count of a node is zero, it is garbage. However, if the reference count is not zero, the node may be garbage if it is part of a cycle. For example, in FIG. 2, each node in subgraph 160 is garbage, even though each node has a reference count that is non-zero. Node 125 originally had a reference count of two (see FIG. 1), but this was decremented to one when the program removed a reference to node 125.

Consequently, every time a reference count of a node is decremented to a non-zero value, the garbage collector keeps track of the node by placing a reference to the node in the root buffer. The references will be called "root nodes" herein. It should be noted that increments to a reference count could cause a root node to be removed from the root buffer. For instance, a reference that is added to the root buffer for a node with a reference count of one may be garbage. However, if a mutator increases the reference count for the node, from one to two, the node cannot be garbage and is root node should be removed from the root buffer.

A computer system operating with a reference count garbage collection system will periodically collect garbage. It is at this point that method 300 begins. In the present disclosure, "synchronous" garbage collection is performed as a "stop the world" process, which means that, while garbage collection occurs, references between nodes cannot be modified. Synchronous garbage collection is therefore the opposite of concurrent garbage collection, which allows references between nodes to be modified during garbage collection. The steps in method 300 are based on a method proposed by R. D. Lins, and this method is discussed in Jones et al., "Garbage Collection," John Wiley and Sons, ch. 3 (1996), the disclosure of which is incorporated herein by reference. Prior to discussing the rest of method 300, a short overview will be given of the method for garbage collection proposed by Lins and described in Jones.

Method 300 begins in step 310, where it is determined if the root buffer is empty. If the root buffer is empty (step 310=YES), the method ends. At this point, garbage collection stops and control is passed back to the system.

If the root buffer is not empty (step 310=NO), a root node from the root buffer is selected (step 320). Before proceeding further, it is worthwhile at this juncture to discuss how garbage collection is commonly depicted. To help when discussing garbage collection and to facilitate actual garbage collection, nodes are assigned specific colors. The color scheme used herein has been previously described.

If the color of the selected root node, R, is not purple or the reference count of the selected root node is zero (step 330=NO), step 310 is performed. If the color of the selected root node is purple and the reference count of the selected root node is greater than zero, then the root node could be part of a cycle of garbage. Steps 400 through 600 are performed to collect cyclic garbage.

Basically, there are three phases of this type of garbage collection. The first phase is marking, which is where a root node referenced by the root buffer is used to find a subgraph and each node in the subgraph is processed. Candidates for garbage collection will be marked during this phase. The first phase corresponds to step 400 of method 300. This first phase also subtracts reference counts, as described in more detail below, as it marks potential garbage. The second phase is the scanning phase, which again looks at a subgraph to determine if the previously marked nodes really are garbage. If so, the nodes are marked as such; if not, they are marked differently to indicate that they are in use. This phase is illustrated by step 500 of method 300. This phase will add reference counts back if the nodes are not garbage. The final phase is the collection phase, where any garbage is collected. In this phase, any reclaimed objects are marked as such. This phase is illustrated by step 600.

Figure 4:
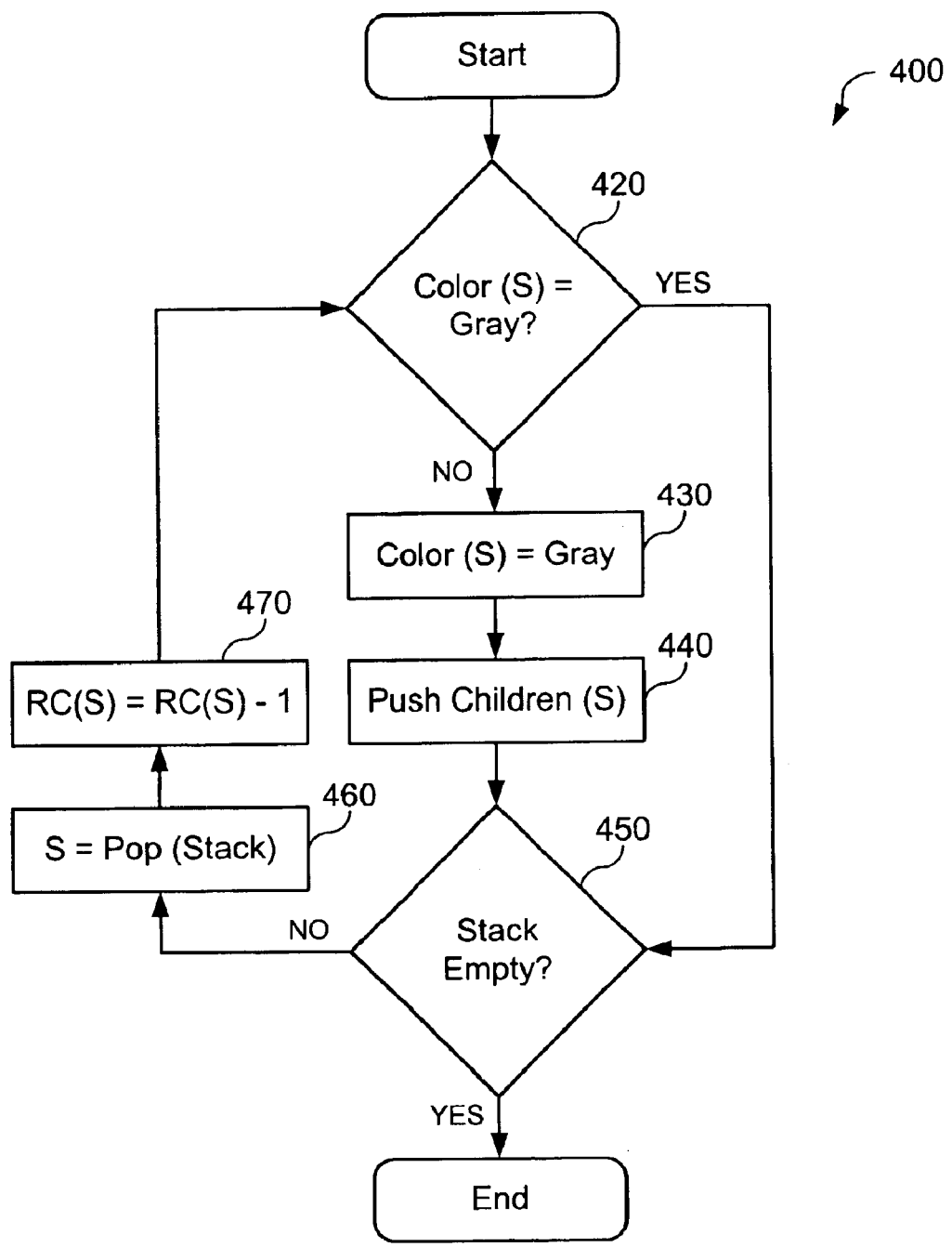
FIGS. 4, 5, and 6 are flowcharts for prior art mark gray, scan, and collect white methods used by the method of FIG. 3.

Referring now to FIG. 4, the mark gray method 400 is shown. As discussed above, method 400 scans the subgraph defined by a root node. During scanning, the color of the nodes are changed and the reference counts for nodes that are referenced by other nodes within the subgraph are decremented. In other words, if a particular node is referenced by another node that exists in the subgraph, the reference count of the particular node is decremented. If all of the reference counts of the nodes in the subgraph defined by the root node are zero (which is determined in method 500, described below), then the subgraph is a cycle of garbage and may be removed (which is performed in method 600, described below). Basically, method 400 decrements reference counts of potential garbage and marks potential garbage nodes with a particular color; if the garbage nodes are not garbage, method 500 (the scan or scan black method) returns the reference counts for these nodes back to their original values and also returns the color to the original color.

Method 400 begins in step 420, where it is determined if the color of the select node is gray. If the color of the selected node, S, is gray, then the method continues in step 450.

If the color of a node is not gray (step 420=NO), the node is colored gray in step 430. The children of the current node are pushed onto a stack in step 440. If the stack is empty (step 450=YES), the method also ends. If the stack is not empty (step 450=NO), the next node from the stack is retrieved in step 460. The reference count of this node is reduced by one (step 470).

The method proceeds in step 420, and the method will continue until the subgraph defined by the root node has been examined.

Figure 5:
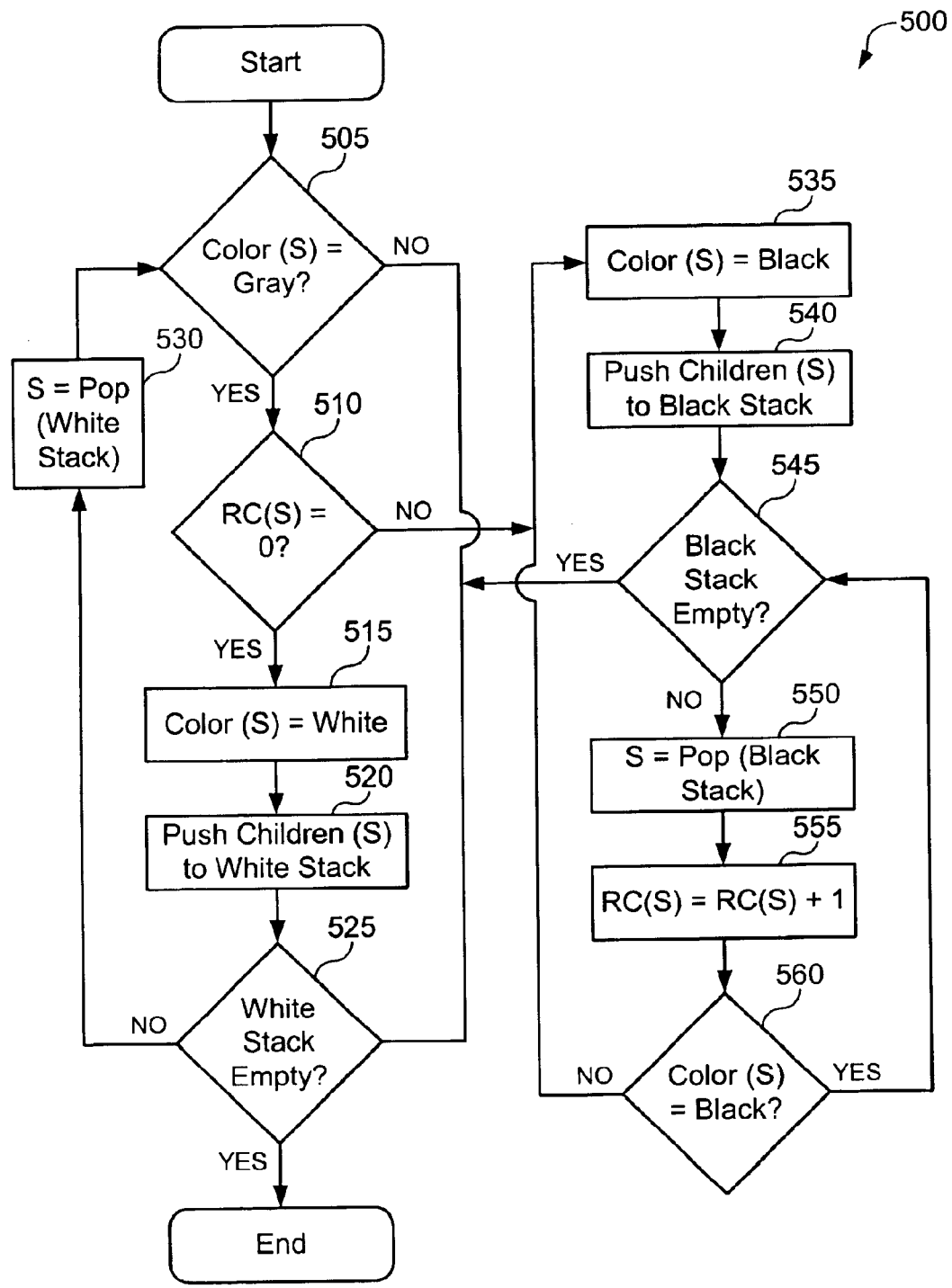

Referring now to FIG. 5, the scan or scan black method 500 is shown. The scanning method revisits the subgraph defined by the root node and determines if the nodes in the subgraph are actually garbage. Basically, method 500 examines each node and determines if the reference count for each node is zero. If the reference count for a node is not zero, then it means that this node is not garbage because this node has a reference to it from a node outside the subgraph defined by the root node. Consequently, this node and its children are colored as in use and the reference counts for these nodes are returned to their original values.

Method 500 basically has two loops: steps 505 through 530 mark nodes as being part of a cycle of garbage; and steps 535 through 560 return nodes to "in use" status because a selected node has been found to not be garbage.

Method 500 starts in step 105 when it is determined if the color of a selected node is gray. Gray means that the node is possibly part of a cycle of garbage. If the color is gray (step 505=YES), then it is determined if the reference count of the selected node is greater than zero. If the reference count of the node is zero (step 510=YES), this means that the selected node only has pointers to it from other nodes that are in the subgraph defined by the root node. Phrased a different way, if the reference count of the selected node is zero, this node does not have any references to it from a node or nodes that are outside the subgraph defined by the root node. Consequently, the selected node is treated as garbage and marked white (step 515) so that the method 500 can determine which nodes have already been examined.

The children of the selected node are pushed onto a stack, called a white stack here for clarity, in step 520. Step 525 is reached if the color of a selected node is not gray (step 505) and if step 520 is performed. In step 525, it is determined if the white stack is empty. If it is empty (step 525=YES), the method 500 ends. If the white stack is not empty (step 525=NO), another node is selected (step 530), and the method continues at step 505.

In step 510, if the reference count of the selected node is not equal to zero (step 510=NO), the selected node is not garbage because there is a node or are nodes that are outside the graph defined by the root node and that reference the selected node. Consequently, the selected node and its children need to be marked as in use. The loop comprising steps 535 through 560 marks them as such.

In step 535, the selected node is marked as black (i.e., in use). The children of the selected node are pushed to a stack, called a black stack herein for clarity, in step 540. In step 545, it is determined if the black stack is empty. If the black stack is empty (step 545=YES), the method 500 continues at step 525. If the black stack is not empty (step 545=NO), another node from the black stack is selected (step 550) and the reference count of the newly selected node is incremented (step 555). The reference count is increased because the parent node references the child node. In method 300, the reference counts of the children nodes corresponding to this parent node were decreased. Essentially, method 300 decreases reference counts for references internal to the subgraph defined by the root node. An internal reference is a reference from one node in the subgraph to another node in the subgraph. When a parent node is discovered, in method 400, to be in use (i.e., not garbage), then the parent node and all its children should have their reference counts increased an appropriate amount.

Consequently, step 555, as described above, is used to increase the reference count of a child node. In step 560, it is determined if the color of the child node is black. If so (step 560=YES), then method 500 continues in step 545. If not (step 560=NO), then the method continues in step 535. After method 500 completes, the nodes that are garbage will be marked as white. Method 600 is then used to collect and free these garbage nodes.

Figure 6:
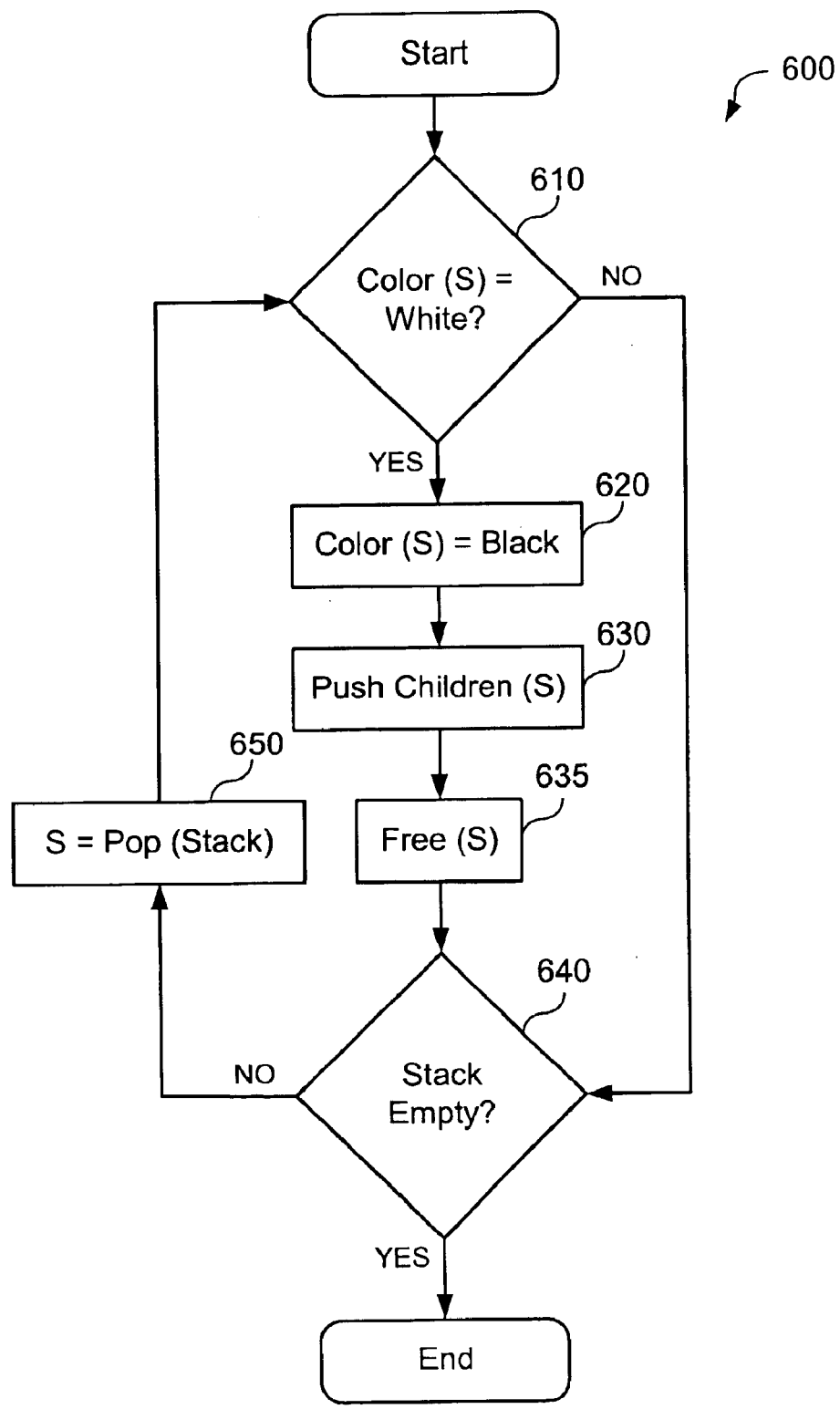

Turning now to FIG. 6, the collect white method 600 is shown. Method 600 begins in step 610, when it is determined if the color of the selected node is white. If the color is white (step 610=YES), then the selected node is colored black (step 620) and the children of the selected node are pushed to a stack (step 630). In step 635, the node is freed. In step 640, it is determined if the stack is empty. If the stack is not empty (step 640=NO), another node is selected from the stack (step 650). If the stack is empty (step 640=YES), the method 600 then ends. Additionally, if the color of the selected node is not white (step 610=NO), the method continues in step 640.

An example from FIG. 2 will be used to illustrate methods 300 through 600. In FIG. 2, a reference to node 125 is added to the root buffer (not shown in FIG. 2) when edge 115 is removed, because the reference count for node 125 decreased but did not decrease to zero. Node 125 is the root node for subgraph 160. Node 125 references node 130, and method 400 will decrement the reference count in node 130 to zero after it follows the reference from node 125 to 130. Additionally, method 300 marks node 130 so that the method can determine that the node has been examined during the marking phase. This mark also indicates that the node is potentially garbage. As explained above, colors are generally used when discussing reference counting techniques. Thus, node 130 is marked gray during step 400, where the gray color indicates that the node is possibly garbage. All nodes start as the color black and the color of a node is changed to purple when it is added to the root buffer.

Because node 130 references node 135, method 400 will then traverse this reference, marking node 135 gray and decrementing its reference count to zero. Finally, method 400 will mark node 125 as gray by following the reference from node 135 to node 125, and will decrement its reference count to zero. When method 400 reaches node 130 again, by following the reference from node 125 to node 130, node 130 will be marked gray, which indicates that it has already been examined. At this point, the marking phase of method 400 is complete.

Next, the scanning phase of method 500 begins. Method 500 again makes a pass through the subgraph 160 and determines if both the color of the node is gray (step 505) and if the reference count for each node in the subgraph is zero (step 510). If these are both true, the node is marked as garbage (step 515). In terms of color, this means that the node is marked white. In FIG. 2, method 500 starts again at the root node, node 125, and will color each node in the subgraph 160 as white. Note that the method 500 will know which nodes have already been examined because these nodes will either be white or black and not gray. The scanning phase of method 500 is complete at this stage.

In FIG. 2, another object (not shown) could reference node 135. In this situation, method 500 would mark node 130 as potential garbage during the marking phase, but then decide that node 135 was not garbage because it has a reference to it from a node external to subgraph 160. This is determined because of a non-zero reference count for node 135. The method 500 will then color node 135 as black (step 535) to indicate that this node is not garbage. Additionally, the method 500 will then color nodes 125 and 130 black (steps 540 through 560) and will end when the children of node 135 are examined. Note that the children of node 135 are, in this example, nodes 125 and 130.

As FIG. 2 illustrates, there is no node outside of subgraph 160 that references a node inside subgraph 160. Consequently, nodes 125 through 135 are garbage. The garbage collection phase begins in step 600. Again, the root node 125 is used to determine and scan the subgraph 160. Every node that is marked as garbage in the subgraph is collected. In terms of colors, this means that any node marked white is collected as garbage. The collected nodes will be marked to indicate that they are free (step 620). Most methods use the color black to indicate that the node is free, although other colors or marks may be used. The memory that encompasses these nodes is also freed (step 635).

Figure 7:
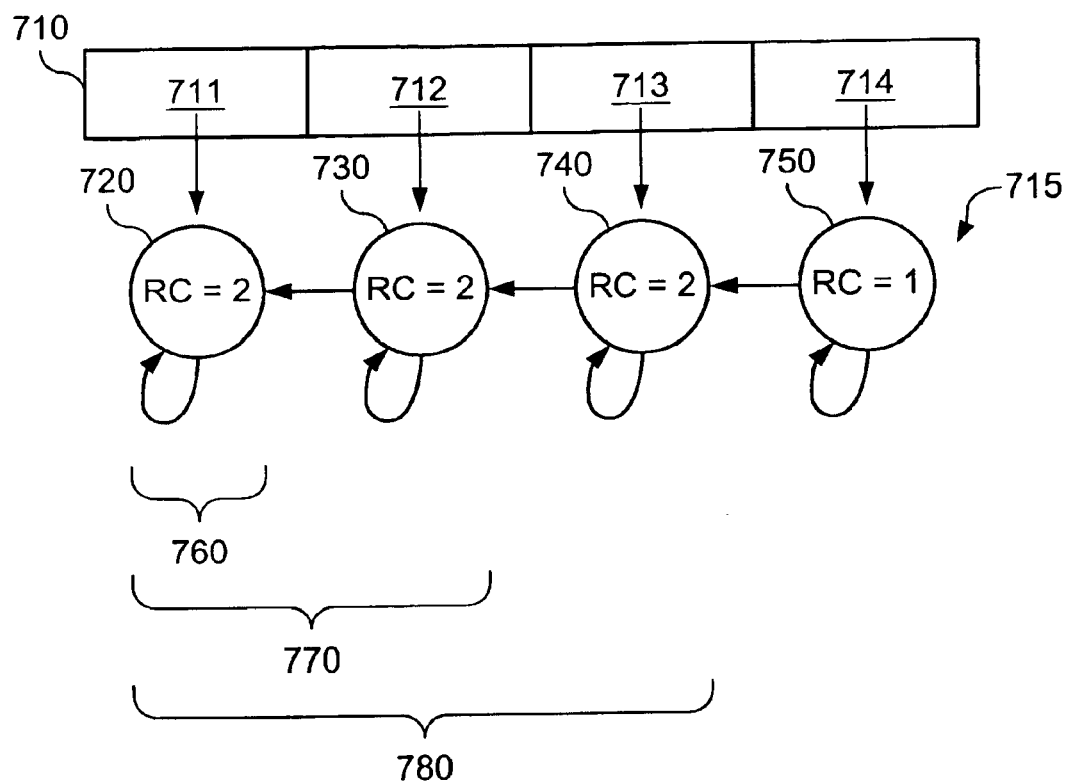
FIG. 7 is a diagram of a root buffer and its references to nodes in a worst-case data structure.

While method 300 is useful for garbage collection, when method 300 is applied as is to large programs, garbage collection delays can extend into minutes. This is impermissible for most applications. One reason that garbage collection takes so long for method 300 is shown in FIG. 7. This figure illustrates a worst-case scenario for garbage collection using reference counting. It also illustrates that a method, even though designed for finding cyclic garbage, must also deal with acyclic garbage. FIG. 7 shows a root buffer 710 and a subgraph 715. Root buffer 710 comprises four references 711, 712, 713, and 714. Each of the four references 711 through 714 point to a node in subgraph 715: reference 711 points to node 720; reference 712 points to node 730; reference 713 points to node 740; and reference 714 points to node 750. Subgraph 715 comprises subgraphs 760, 770, and 780.

When method 300 operates on root buffer 410, it will perform steps 330 through 600 on node 720, which defines subgraph 760. When method 300 performs these steps on this node, it will not find garbage because node 720 is referenced by node 730, which is outside subgraph 760. Thus, node 720 is not collected as garbage after this first iteration.

Next, method 300 will perform steps 330 through 600 on node 730 and its subgraph 770. Again, no garbage is collected because node 730 is referenced by node 740, which is outside subgraph 770. Again, method 300 performs steps 330 through 600 on subgraph 780. No garbage is collected because node 740 is referenced by node 750, which is outside subgraph 780. Finally, method 300 performs steps 330 through 600 on node 750 and its defined subgraph 715. Method 300 will then collect subgraph 715 and each of its nodes as garbage.

Thus, method 300 exhibits quadratic complexity, which is commonly referred to as $O(N^2)$, where N is the number of nodes in the object graph reached via the root buffer. In other words, if there are 1,000 nodes in the object graph reached via a root buffer, it is possible for method 300 to take on the order of 1,000,000 (or 1,000 multiplied by 1,000) operations to complete in a worst-case scenario.

Synchronous Collection of Cyclic Garbage

The present invention dramatically reduces the number of operations it takes to collect cyclic garbage in a reference counting garbage collection system. The present invention does this by performing each phase of the marking, scanning, and collecting phases on all nodes in the root buffer. This change drastically reduces the number of operations for garbage collection.

A benefit of the present invention is best illustrated through example. As previously indicated, FIG. 7 shows a root buffer 710 and a subgraph 715. Again, root buffer 710 is a location used to keep nodes whose reference count was decremented to a non-zero value. As described above, decrementing a reference count to a non-zero value can indicate cyclic garbage.

When the present invention is used to collect garbage on the subgraph of FIG. 7, the present invention will perform a marking phase on the entire subgraph 715. Thus, after the marking phase, each of these nodes 720 through 750 will be marked as potential garbage. The present invention then performs a scanning phase, which will mark the potential garbage as truly garbage, and a collection phase, which will collect all the garbage. The present invention has a linear number of operations for the graph or subgraph being examined. The number of operations is O(N+E), where N is the number of nodes (also called "objects" herein) in the object graph reached via the root buffer and E is the number of edges (also called "references" herein). This means that a graph having 1,000 objects will take on the order of 1,000 operations with the present invention, even in a worst-case scenario. Prior methods of garbage collection, as discussed above, take $O(N^2)$ operations to perform the same garbage collection. Consequently, the present invention is a tremendous improvement over previous methods of garbage collection for a reference counting garbage collection system.

Additionally, a number of other benefits are disclosed. In particular, nodes are marked if they are in the root buffer, such that nodes will be added to the root buffer only once. Finally, nodes that cannot be roots of cyclic garbage are discovered and marked as acyclic. Therefore, these acyclic nodes are not examined or stored as root nodes during garbage collection for the purpose of removing cyclic garbage.

Figure 8:
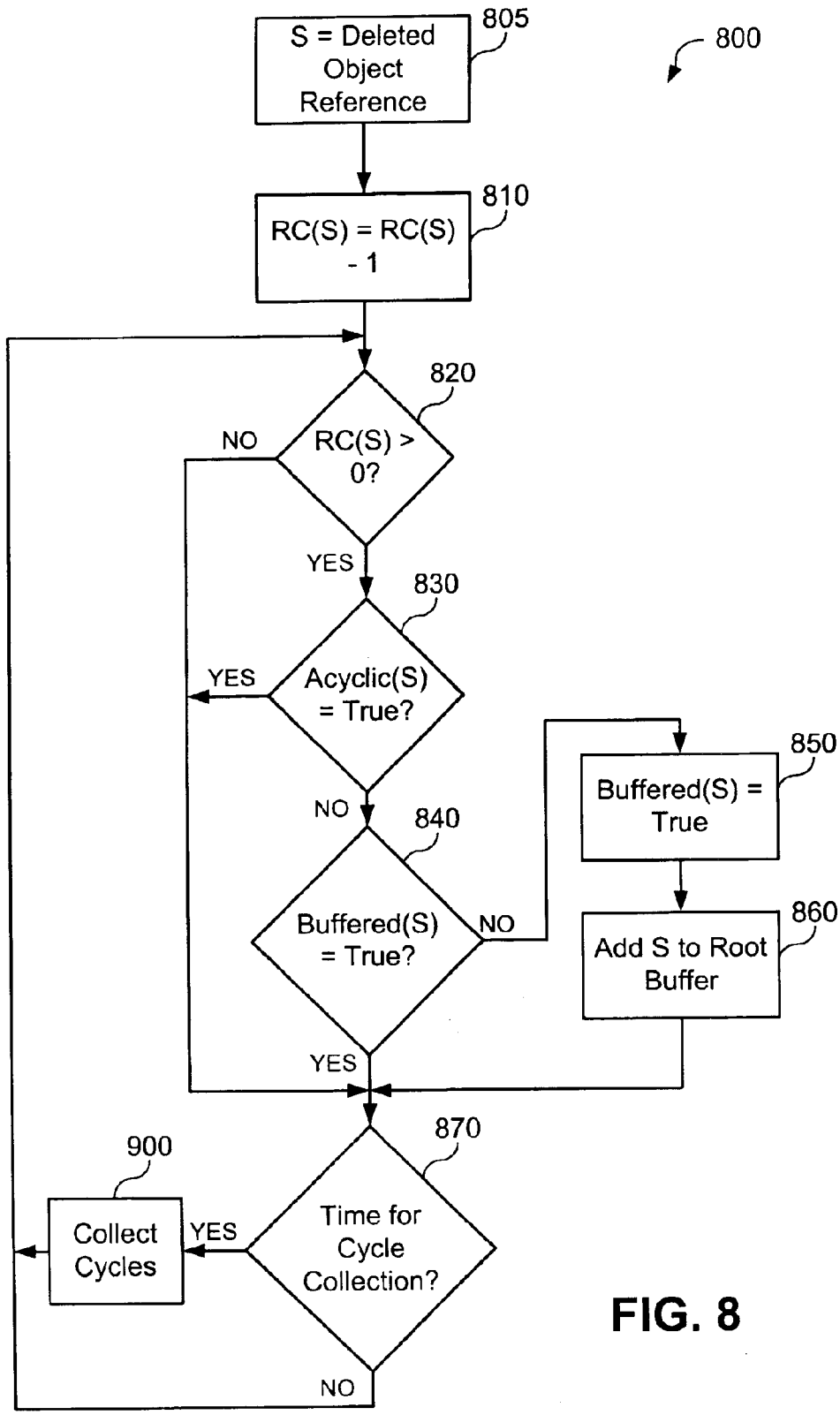
FIG. 8 is a flowchart of an exemplary diagram for the synchronous collection of garbage, in accordance with one embodiment of the present invention.

Turning now to FIG. 8, a method 800 for the synchronous collection of cyclic garbage is shown. Method 800 is performed at various stages of execution and compilation of a program and while a computer system operates. This is discussed in detail below.

Generally, steps 805 through 860 and 900 will be performed by a garbage collector. Step 870 will usually be performed by a language run-time system. Method 800 begins in step 805, where the reference S is assigned to a deleted object reference. A garbage collector keeps track of objects whose reference count has been changed. In the situation where the reference count is decreased, initially one object references another object. When the first object deletes its reference to the second object, the garbage collector keeps track of this deletion by assigning the reference S to the recently deleted object reference.

In step 810, the reference count of the node is decremented. Decrement operations may be performed in a write barrier or at some later time if the decrements are deferred by writing them into a buffer. The write barrier is discussed in Lins, which has been discussed and incorporated by reference above.

In step 820, it is determined if the reference count of the node has been decreased but not to zero. If not (step 820=NO), the method skips to step 870. If so (step 820=YES), it is determined in step 830 if the object is acyclic.

A significant improvement can be obtained for cycle collection by observing that some objects are inherently acyclic. It is speculated that acyclic objects will comprise the majority of objects in many applications. Therefore, if cycle collection can be avoided for inherently acyclic objects, the overhead of cycle collection as a whole will be significantly reduced. Acyclic objects are those objects that cannot be roots of a cycle. For instance, an object that contains one scalar and no references to other objects cannot reference another object and, hence, cannot be a root of a cycle. Additional types of acyclic objects are described below. It should be noted that an acyclic node can be part of a cycle. For instance, a root node could refer to an acyclic node. However, an acyclic node itself cannot be the root of a cycle.

Acyclic objects are marked to indicate that they are acyclic. The marking preferably occurs during compilation. In one embodiment, the present invention marks objects whose class is acyclic with the special color green. A static compiler is one mechanism that can perform this marking. In a static compiler, a more sophisticated program analysis could be applied to increase the percentage of acyclic objects. In the programming language Java, dynamic class loading complicates the determination of inherently acyclic data structures. In this case, the class loader is modified to dynamically mark acyclic classes. Acyclic classes may contain any of the following: scalars; references to classes that are both acyclic and final; and arrays of either of the above.

Acyclic objects are ignored by the cycle collection steps, except that when a dead cycle refers to acyclic objects, the acyclic objects are collected along with the dead cycle. A dead cycle is a cycle that is determined to be garbage. While this determination of acyclic classes is very simple, it is also very effective. It usually reduces the objects considered as roots of cycles by an order of magnitude.

Consequently, in step 830, it is determined if the object is acyclic. If the object is acyclic (step 830=YES), the object is not added to the root buffer and the method continues in step 870.

If the object is not acyclic (step 830=NO), then step 840 is performed, where it is determined if the object is already in the root buffer. A simple way to determine if an object is in the root buffer is to add a "buffered" flag to each object. If the buffered flag is true, the true state of the buffered flag indicates that a reference to the object is already added to the root buffer. Initially, the buffered flag for each object would be false. If the buffered flag is true (step 840=YES), a reference to the object already exists in the root buffer and another reference to it is not added to the root buffer. The method continues at step 870. If the buffered flag is false (step 840=NO), then step 850 will set the buffered flag for this object. The set buffered flag indicates that the object resides in the root buffer. When the root buffer is subsequently cleared (see method 900 below), the buffered flag for the object will be cleared. In step 860, the node is added to the root buffer. Note that step 860 will also change the color of the node from black to purple. Purple indicates that the node is a possible root of a cycle.

In step 870, it is determined if it is time for garbage collection. A reference counting garbage collection system will periodically collect garbage. If it is not an appropriate time for garbage collection (step 870=NO), then the method continues at step 810. If is an appropriate time for garbage collection (step 870=YES), then garbage collection is performed in step 900. Although not shown in FIG. 8, prior to step 900, preparations for garbage collection take place. As already discussed, in reference counting systems, synchronous garbage collection is generally performed as a "stop the world" process, which means that, while garbage collection occurs, changes to the references are not allowed.

Thus, prior to step 900, the current processes are stopped and garbage collection begins. Additionally, nodes having zero reference counts may also be collected as garbage in step 900 or prior to or after step 900. Any preparations for garbage collection, such as memory allocation, are performed prior to method 900 or in method 900. Such preparation steps are well known to those skilled in the art.

Figure 9A:
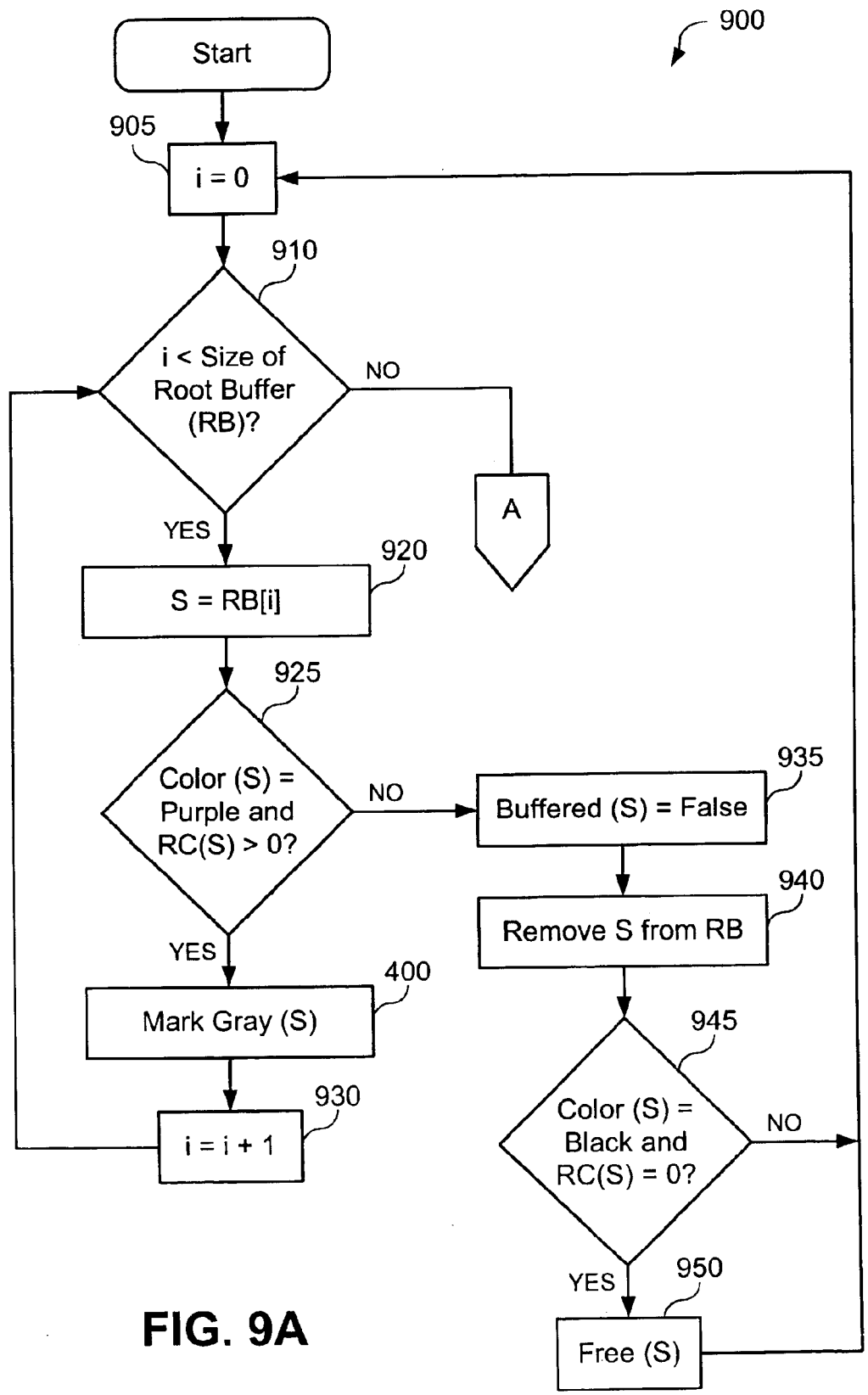
FIGS. 9A and 9B, collectively, are a flowchart of a method of garbage collection for cyclic data structures in a reference counting computer system, in accordance with one embodiment of the present invention.
Figure 9B:
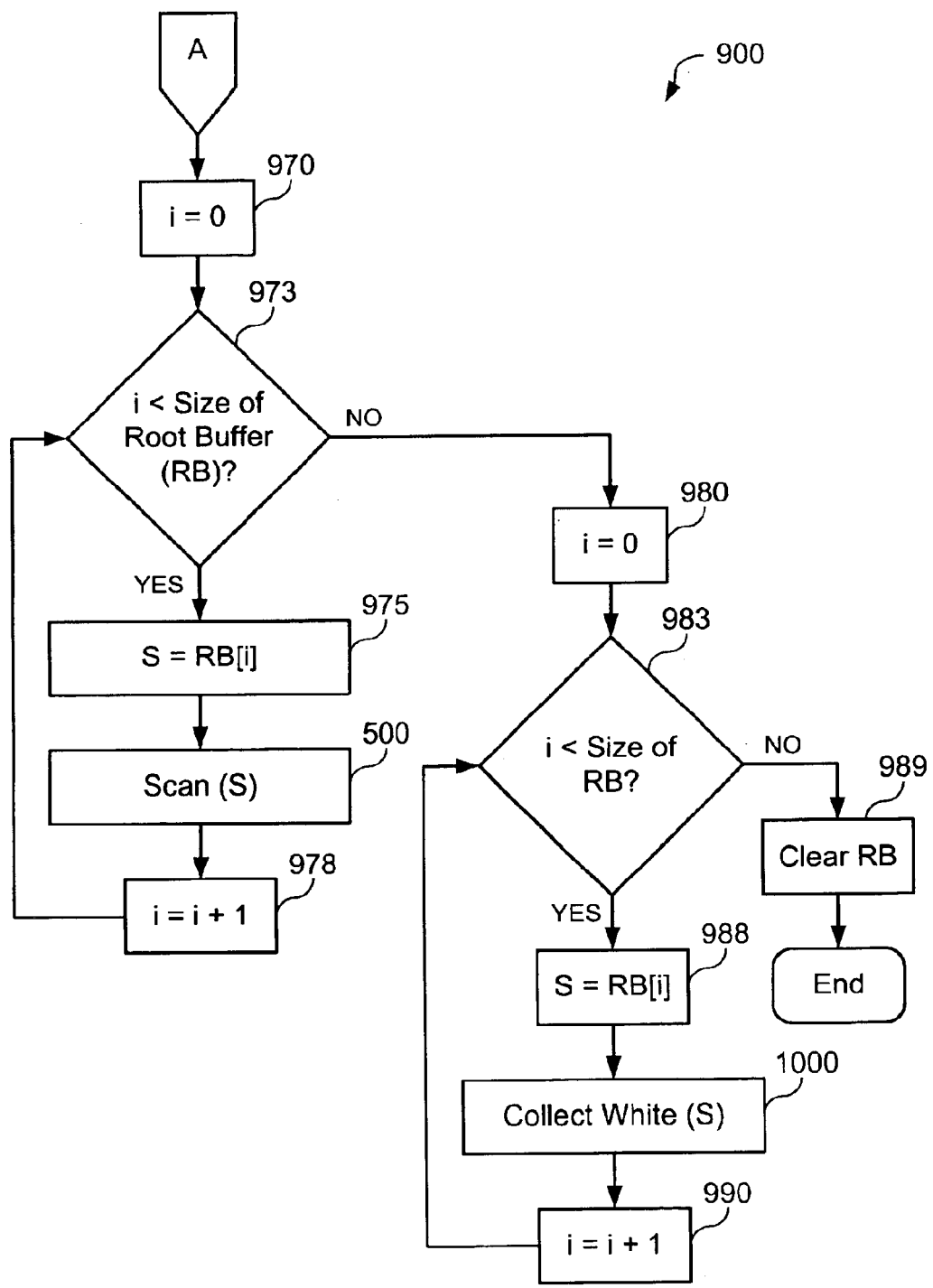

Turning to FIG. 9, an exemplary method 900 for the synchronous collection of garbage is shown. Basically, method 900 comprises three loops. The first loop comprises steps 905 through 930 and step 940, and this loop performs marking of all the root nodes and the nodes of their subgraphs. The second loop comprises steps 970 through 978 and step 500, and this second loop scans all the root nodes and the nodes of their subgraphs. Finally, the third loop comprises steps 980 through 990 and step 1100, and the third step collects the nodes marked as garbage.

Essentially, method 900 individually performs the phases of marking, scanning, and collecting on all of the nodes in the root buffer and the subgraphs defined by those nodes. In other words, the Lins algorithm, described in Jones et al., "Garbage Collection," John Wiley and Sons, ch. 3 (1996) and discussed above, selects a node from the root buffer and then performs the marking, scanning and collection phases on this node. This process continues until each node has been selected and processed. The Lins algorithm is quadratic in complexity, such that increasing graph complexity causes a quadratic increase in number of operations performed. In method 900, however, all of the nodes in the root buffer are subjected to the marking phase, then all of the nodes in the root buffer are subjected to the scanning phase, and finally all of the nodes in the root buffer are subjected to the collection phase. The cycle collection aspects of method 900 are linear in terms of complexity, meaning that increasing graph complexity causes a linear increase in number of operations performed.

In terms of method 900, garbage collection begins in step 905 when a variable, denoted "i," is set to zero. In step 910, it is determined if the variable is less than the size of the root buffer. If so (step 910=YES), then a root (labeled "S") is selected from the root buffer in step 920. In step 925, it is determined if the color of the selected node is purple and if the reference count of the selected node is non-zero. If so (step 925=YES), the node is marked gray (step 400). Step 400 has been described in reference to FIG. 4. In step 930, the variable is incremented, and the method returns to step 905.

In step 925, if the color of the node is not purple or if the reference count of the node is equal to zero (step 925=NO), the node is not the root of a cycle of garbage but may be garbage. For example, if a particular node originally had a reference count of two, and this reference count was decremented to one, the particular node would be colored purple and a reference to the particular node would be placed into the root buffer. Subsequently, another node might reference this particular node, which causes the node to be recolored to black and the reference count for the particular node to be increased. The reference to the particular node is not, however, removed from the root buffer. This particular node will fail step 925, but it is not garbage. Another way for a node to fail step 925 is as follows. If a certain node has an initial reference count of two, and this reference count is decremented to one, a reference to the certain node will be stored in the root buffer and the certain node will be colored purple. This certain node could then have its reference count decremented to zero, and the color would be changed to black. The color is changed to black because this certain node cannot be the root of a cycle of garbage. This certain node will fail 925. Additionally, this certain node is now garbage and should be freed.

In step 925, if the color of the node is not purple or if the reference count of the node is equal to zero (step 925=NO), the buffered flag is reset (step 935) to indicate that the node has been removed from the root buffer, and the node is removed from the root buffer (step 940). Step 945 determines if the node is garbage. If the color of the node is black and the reference count is zero (step 945=YES), the node is garbage and is freed (step 950). If the color of the node is not black and or the reference count is not zero (step 945=YES), the node is not garbage and the method continues in step 905.

In step 910, if the variable is the size of the root buffer, all of the root nodes in the root buffer have been examined. Thus, method 900 continues to step 970 to perform the scanning phase. In step 970, the variable is again set to zero. In step 973, it is checked if the variable is less than the size of the root buffer. If the variable is less than the size of the root buffer (step 973=YES), the next root node in the root buffer is selected (step 975). The step of scanning is performed (step 500), as has been described in reference to FIG. 5. In step 978, the variable is incremented and the method continues at step 973.

In step 973, when the variable is as large as the root buffer (step 973=NO), the method 900 continues to the collecting phase. The collecting phase begins in step 980, where the variable is again set to zero. In step 983, it is determined if the variable is smaller than the size of the root buffer. If so (step 983=YES), the next root node in the root buffer is selected (step 988), all the garbage nodes are collected (step 1100), the variable is incremented (step 990), and the method continues in step 983. If the variable is as large as the size of the root buffer (step 980=NO), then the root buffer is cleared (step 989) and the method ends.

Thus, method 900 individually performs the phases of marking, scanning, and collecting on all of the nodes in the root buffer and the subgraphs defined by those nodes.

It should be noted that methods 400, 500, and 60 may be implemented differently, when implementing the present invention, than the methods that are shown. For example, these methods may have to be modified if the acyclic marking and consideration techniques of the present invention are implemented. The modification of these methods to implement the acyclic techniques of the present invention is straightforward.

Figure 10:
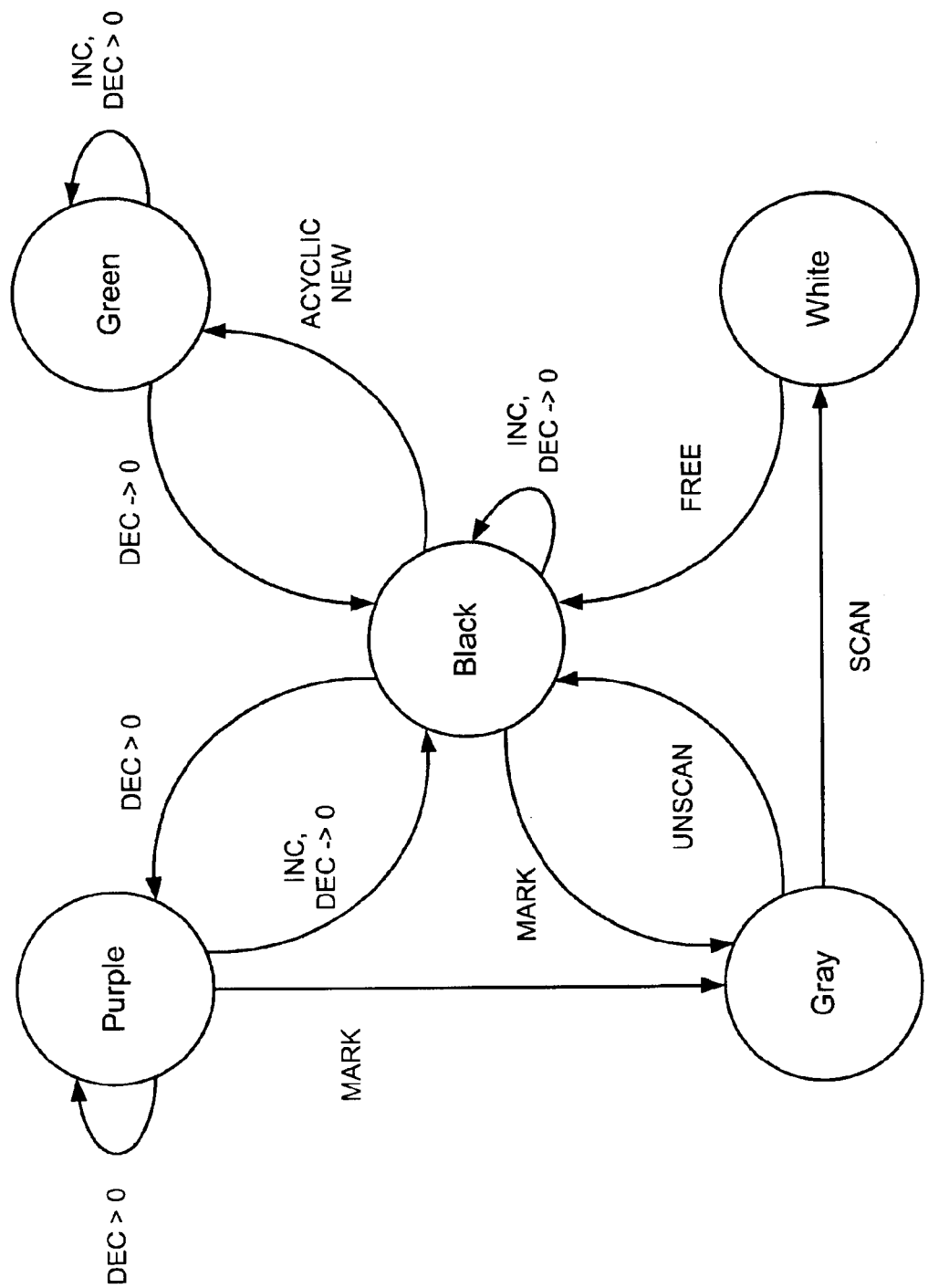
FIG. 10 is a state transition graph for garbage collection of cyclic data structures in a reference counting computer system, in accordance with one embodiment of the present invention.

Referring now to FIG. 10, this figure shows a state transition graph for collection of cyclic garbage in a reference counting computer system, in accordance with one embodiment of the present invention. All objects start as black. As previously described, the meanings of the colors used herein are as follows: black indicates that a node is "in use" or "free"; gray indicates that a node is a possible member of a cycle; white indicates that a node is a member of a cycle; purple indicates a possible root of a cycle; and green indicates that the node is acyclic. If it is determined that an object is acyclic, it is colored green. A decrement to zero while in a green state will cause the object to be colored black. When in the green state, increments of the reference count and decrements of the reference count to a non-zero value do not change the state.

If the state is black, increments to the reference count and decrements of the reference count to zero do not change the state. A decrement of the reference count to a non-zero value will cause the object to be colored purple. While in the purple state, a decrement to the reference count to a non-zero value does not change the state. A decrement to zero or an increment will change the color to black. When method 900 of FIG. 9 performs garbage collection, it will mark purple objects as gray if they have been examined.

If state is black, method 900 will change the color from black to gray during the marking phase. When the object is gray, a scan will cause the object to be marked white if the reference count of the object is zero. A scan occurs during the scanning phase. An unscan will cause the object to be changed from gray to black. An unscan occurs when it is determined that a cycle is not garbage. For instance, in FIG. 2, another object (not shown) could reference node 135. In this situation, method 900 would mark node 130 as potential garbage during the marking phase, but then decide that node 135 was not garbage because it has a reference to it from an object external to subgraph 160. The method 900 will then unscan node 130 to indicate that this node is not garbage.

If the object is white, a free operation, which returns the object to the heap, will mark the object as black.

Referring now to FIG. 11, a listing of pseudocode instructions is shown that may be used to implement garbage collection of cyclic data structures in a reference counting computer system, in accordance with one embodiment of the present invention.

In addition to the buffered flag, each object contains a color and a reference count. For an object T, these fields are denoted buffered(T), color(T), and RC(T). In this exemplary implementation, these quantities together occupy a single word in each object. All objects start out black. A summary of the colors used by a garbage collector is shown in FIG. 10 above.

Increment and Decrement are invoked externally as pointers are added, removed, or overwritten. CollectCycles is invoked either when the root buffer overflows, storage is exhausted, or when the collector decides for some other reason to free cyclic garbage. The rest of the procedures are internal to the cycle collector. Note that the procedures MarkGray, Scan, and ScanBlack are the same as for the algorithm created by Lins, which is discussed in Jones et al., "Garbage Collection," John Wiley and Sons, ch. 3 (1996). Descriptions of the methods of the present invention, many of which are different from the Lins algorithms, are given immediately below.

Increment(S): When a reference to a node S is created, the reference count of T is incremented and it is colored black, since any object whose reference count was just incremented can not be garbage.

Decrement(S): When a reference to a node S is deleted, the reference count is decremented. If the reference count reaches zero, the procedure Release is invoked to free the garbage node. If the reference count does not reach zero, the node is considered as a possible root of a cycle.

Release(S): When the reference count of a node reaches zero, the contained pointers are deleted, the object is colored black, and unless it has been buffered, it is freed. If it has been buffered, it is in the Roots buffer and will be freed later (in the procedure MarkRoots).

PossibleRoot(S): When the reference count of S is decremented but does not reach zero, it is considered as a possible root of a garbage cycle. If its color is already purple, then it is already a candidate root; if not, its color is set to purple. Then the buffered flag is checked to see if it has been purple since we last performed a cycle collection. If it is not buffered, it is added to the buffer of possible roots.

CollectCycles( ): When the root buffer is full, or when some other condition, such as low memory occurs, the actual cycle collection operation is invoked. This operation has three phases: MarkRoots, which removes internal reference counts; ScanRoots, which restores reference counts when they are non-zero; and finally CollectRoots, which actually collects the cyclic garbage.

It is worthwhile at this point to contrast the present invention with the algorithm proposed by Lins, which can be seen at page 64, Algorithm 3.16, Jones et al., "Garbage Collection," John Wiley and Sons (1996). Algorithm 3.16 is repeated here:

--- gc_control_set ( ) =
   S = pop (control_set)
   if colour (S) = = purple
      mark_grey (S)
      scan (S)
      collect_white (S)
   else if control_set ≠ empty
      gc_control_set (S)

---

The "gc_control_set" corresponds to CollectCycles; the "mark_grey" corresponds to MarkRoots; the "scan" corresponds to ScanRoots; and the "collect_white" corresponds to CollectWhite. The "control_set" corresponds to the root buffer as used herein. The Lins algorithm retrieves one root node and performs the steps of marking, scanning, and collecting on this node. Another node is retrieved and the steps of marking, scanning, and collecting are performed on this node. This process continues until all root nodes in the root buffer (or "control set," as used in the Lins algorithm) have been examined.

In contrast, the CollectCycles routine of the present invention performs the step of marking on all purple root nodes, performs the step of scanning on all purple root nodes, and performs the step of collecting on all purple root nodes.

MarkRoots( ): The marking phase looks at all the nodes S whose pointers have been stored in the Roots buffer since the last cycle collection. If the color of the node is purple (indicating a possible root of a garbage cycle) and the reference count has not become zero, then MarkGray(S) is invoked to perform a depth-first search in which the reached nodes are colored gray and internal reference counts are subtracted. Otherwise, the node is removed from the Roots buffer, the buffered flag is cleared, and if the reference count is zero the object is freed.

ScanRoots( ): For each node S that was considered by MarkGray(S), this procedure invokes Scan(S) to either color the garbage subgraph white or re-color the live subgraph black.

CollectRoots( ): After the ScanRoots phase of the CollectCycles procedure, any remaining white nodes will be cyclic garbage and will be reachable from the Roots buffer. This procedure invokes CollectWhite for each node in the Roots buffer to collect the garbage; all nodes in the root buffer are removed and their buffered flag is cleared.

MarkGray(S): This procedure performs a simple depth-first traversal of the graph beginning at S, marking visited nodes gray and removing internal reference counts as it goes.

Scan(S): If this procedure finds a gray object whose reference count is greater than one, then that object and everything reachable from it are live data; it will therefore call ScanBlack(S) in order to re-color the reachable subgraph and restore the reference counts subtracted by MarkGray. However, if the color of an object is gray and its reference count is zero, then it is colored white, and Scan is invoked upon its children. Note that an object may be colored white and then re-colored black if it is reachable from some subsequently discovered live node.

ScanBlack(S): This procedure performs the inverse operation of MarkGray, visiting the nodes, changing the color of objects back to black, and restoring their reference counts.

CollectWhite(S): This procedure recursively frees all white objects, re-coloring them black as it goes. If a white object is buffered, it is not freed; it will be freed later when it is found in the Roots buffer.

Figure 12:
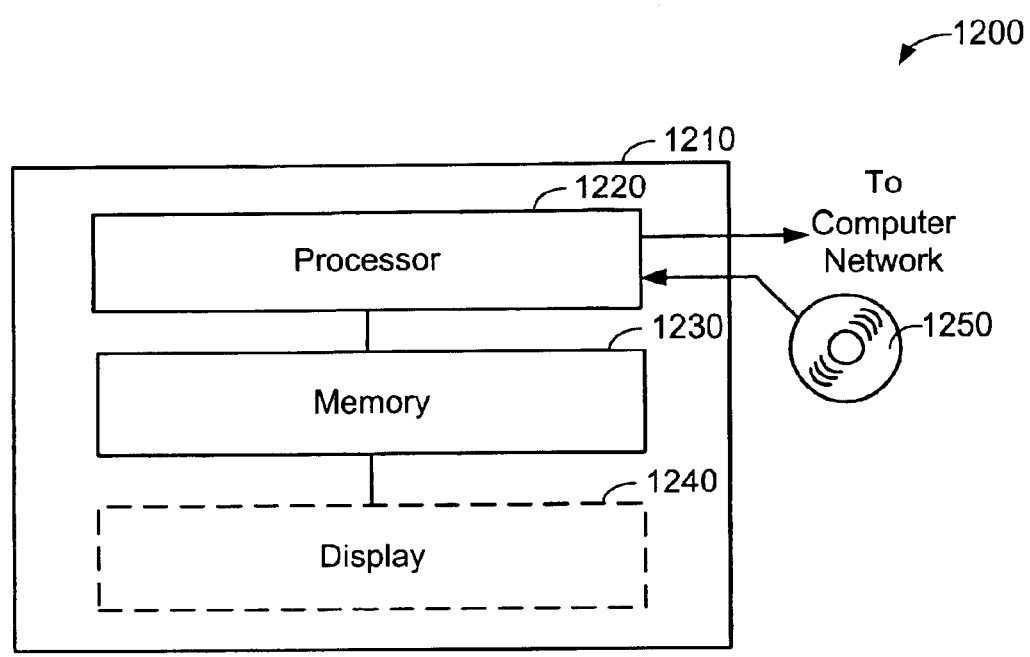
FIG. 12 is a block diagram of an exemplary system suitable for carrying out embodiments of the present invention.

Turning now to FIG. 12, a block diagram is shown of an exemplary system 1200 suitable for carrying out embodiments of the present invention. System 1200 comprises a computer system 1210 and a Compact Disk (CD) 1250. Computer system 1210 comprises a processor 1220, a memory 1230 and an optional video display 1240.

As is known in the art, the methods and apparatus discussed herein may be distributed as an article of manufacture that itself comprises a computer-readable medium having computer-readable code means embodied thereon. The computer readable program code means is operable, in conjunction with a computer system such as computer system 1210, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 1250.

Memory 1230 configures the processor 1220 to implement the methods, steps, and functions disclosed herein. The memory 1230 could be distributed or local and the processor 1220 could be distributed or singular. The memory 1230 could be implemented as an electrical, magnetic or optical memory, or any combination of these or other types of storage devices. Moreover, the term "memory" should be construed broadly enough to encompass any information able to be read from or written to an address in the addressable space accessed by processor 1210. With this definition, information on a network is still within memory 1230 because the processor 1220 can retrieve the information from the network. It should be noted that each distributed processor that makes up processor 1220 generally contains its own addressable memory space. It should also be noted that some or all of computer system 1210 can be incorporated into an application-specific or general-use integrated circuit.

Optional video display 1240 is any type of video display suitable for interacting with a human user of system 1200. Generally, video display 1240 is a computer monitor or other similar video display.

It is to be understood that the embodiments and variations shown and described herein are merely illustrative of the principles of this invention and that various modifications may be implemented by those skilled in the art without departing from the scope and spirit of the invention.

What is claimed is:

1. A computer-implemented method for collecting cyclic garbage in a reference counting system having a plurality of nodes, N, interconnected through a plurality of edges, E, the method comprising the steps of:

determining candidate nodes that are possibly part of cycles of garbage; and performing a number of operations on each candidate node, wherein the step of performing is N+E in complexity and wherein the step of performing collects candidate nodes, and cycles defined by the candidate nodes, that are garbage.

2. The computer-implemented method of claim 1, wherein the number of operations comprises operations of marking, scanning, and collecting.

3. A computer-implemented method for collecting cyclic garbage in a reference counting computer system, the computer system comprising a plurality of nodes, at least two of the nodes are interconnected through edges, the method comprising the steps of:

determining which nodes maybe part of a cycle of garbage;

for every node that may be part of a cycle of garbage, performing a step of marking;

for every node that may be part of a cycle of garbage, performing a step of scanning; and for every node that may be part of a cycle of garbage, performing a step of collecting.

4. The computer-implemented method of claim 3, wherein the step of determining which nodes maybe part of a cycle of garbage further comprises the steps of:

determining every node whose reference count is decremented to a non-zero value; and selecting each node whose reference count is decremented to a non-zero value as a root node.

5. The computer-implemented method of claim 4, wherein the step of selecting each node whose reference count is decremented to a non-zero value as a root node further comprises the steps of:

storing references to the root nodes in a buffer; and for each node whose reference count is decremented to a non-zero value, performing the following steps:

determining the node already has a reference to the node in the buffer; and when a node has already has a reference to the node in the buffer, ensuring that additional references to the node are not stored in the buffer.

6. The computer-implemented method of claim 3, wherein:

the step of marking comprises the steps of:

searching each subgraph defined by the root nodes; and subtracting internal reference counts for each node in each subgraph;

the step of scanning comprises the steps of:

searching each subgraph defined by the root nodes; and determining which nodes are garbage and which nodes are in use; and the step of collecting comprises the step of removing the nodes that are garbage.

7. The computer-implemented method of claim 3, wherein the step of determining which nodes may be part of a cycle of garbage further comprises the steps of:
  determining if a node is acyclic; and
  when a node is acyclic, excluding the node from the nodes that may be part of a cycle of garbage.

8. A computer-implemented method performed in a reference counting computer system, the computer system comprising a plurality of nodes, at least two the nodes are interconnected through edges, the method comprising the steps of:
  determining if a node is acyclic; and
  marking the node as acyclic when the node is acyclic.

9. The computer-implemented method of claim 8, further comprising the step of:
  determining that the node is acyclic; and
  ignoring the acyclic node when searching for cyclic garbage.

10. The computer-implemented method of claim 9, wherein the step of ignoring further comprises the steps of:
  determining if the node has a reference count decremented to a non-zero value;
  adding the node to a buffer when the node is not marked as acyclic; and
  searching for cyclic garbage by using nodes in the buffer.

11. The computer-implemented method of claim 8, wherein the step of determining if a node is acyclic further comprises the step of determining if a class of a node is acyclic.

12. The computer-implemented method of claim 11, wherein the step of determining if a class of a node is acyclic further comprises the step of determining if a class comprises one or more of scalars, references to classes that are both acyclic and final, at least one array of scalars, and at least one reference to a class that is both acyclic and final.

13. A computer-implemented method performed in a reference counting computer system, the computer system comprising a plurality of nodes, at least two the nodes are interconnected through edges, the computer system further comprises a root buffer adapted to hold a plurality of references, each of the references able to reference a node, the method comprising the steps of:
  determining if a node already has a reference to the node in the root buffer;
  adding the node to the root buffer when the node does not already have a reference to the node in the root buffer; and
  marking the node as added to the root buffer when the reference to the node is initially added to the root buffer.

14. A computer-implemented system comprising:
  a memory that stores computer-readable code;
  a plurality of nodes residing in the memory, at least two of the nodes interconnected through edges; and
  a processor operatively coupled to the memory, the processor configured to implement the computer-readable code, the computer-readable code configured to:
    determine which nodes may be part of a cycle of garbage;
    for every node that may be part of a cycle of garbage, perform a step of marking;
    for every node that may be part of a cycle of garbage, perform a step of scanning; and
    for every node that may be part of a cycle of garbage, perform a step of collecting.

15. The system computer-implemented of claim 14, wherein the computer-readable code is further configured, when determining which nodes may be part of a cycle of garbage, to:
  determine every node whose reference count is decremented to a non-zero value;
  select each node whose reference count is decremented to a non-zero value as a root node;
  store references to the root nodes in a buffer; and
  for each node whose reference count is decremented to a non-zero value, perform the following steps:
    determine the node already has a reference to the node in the buffer; and
    when a node has already has a reference to the node in the buffer, ensure that additional references to the node are not stored in the buffer.

16. The computer-implemented system of claim 14, wherein the computer-readable code is further configured, when determining which nodes may be part of a cycle of garbage, to:
  determine if a node is acyclic; and
  when a node is acyclic, exclude the node from the nodes that may be part of a cycle of garbage.

17. An article of manufacture comprising: a computer readable medium having computer-readable code means embodied thereon, the computer-readable program code means comprising:
  a step to determine which nodes, of a plurality of nodes interconnected through edges, may be part of cycle of garbage;
  for every node that may be part of a cycle of garbage, a step to perform a step of marking;
  for every node that may be part of a cycle of garbage, a step to perform a step of scanning; and
  for every node that may be part of a cycle of garbage, a step to perform a step of collecting.

18. The article of manufacture of claim 17, wherein the computer-readable code means, when determining which nodes may be part of a cycle of garbage, further comprises:
  a step to determine every node whose reference count is decremented to a non-zero value;
  a step to select each node whose reference count is decremented to a non-zero value as a root node;
  a step to store references to the root nodes in a buffer; and
  for each node whose reference count is decremented to a non-zero value, a step to perform the following:
    a step to determine the node already has a reference to the node in the buffer; and
    when a node has already has a reference to the node in the buffer, a step to ensure that additional references to the node are not stored in the buffer.

19. The article of manufacture of claim 17, wherein the computer-readable code means, when determining which nodes may be part of a cycle of garbage, further comprises:
  a step to determine if a node is acyclic; and
  when a node is acyclic, a step to exclude the node from the nodes that may be part of a cycle of garbage.

* * * * *

UNITED STATES PATENT AND TRADEMARK OFFICE
CERTIFICATE OF CORRECTION

PATENT NO.    : 6,879,991 B2
DATED         : April 12, 2005
INVENTOR(S)   : Bacon It is certified that error appears in the above-identified patent and that said Letters Patent is hereby corrected as shown below:

Column 16,
Line 53, before "already" and after "node" delete "has".

Column 17,
Line 39, before "the" and after "two" insert -- of --.

Column 18,
Line 3, before "of" and after "The" replace "system computer-implemented" with -- computer-implemented system --.
Lines 14 and 53, before "the" and after "determine" insert -- if --.
Lines 16 and 55, before "already" and after "node" delete "has".

Signed and Sealed this

Twentieth Day of September, 2005

JON W. DUDAS
*Director of the United States Patent and Trademark Office*